United States Patent
Heffel et al.

(10) Patent No.: US 10,731,866 B2
(45) Date of Patent: Aug. 4, 2020

(54) QUICK-FASTENING ELEMENT, GUIDE RAIL AND USE

(71) Applicant: Accuride International GmbH, Diez (DE)

(72) Inventors: Andreas Heffel, Bendorf (DE); Friedhelm Petri, Cramberg (DE); Fabian Mainusch, Koblenz (DE)

(73) Assignee: ACCURIDE INTERNATIONAL GMBH, Diez (DE)

( * ) Notice: Subject to any disclaimer, the term of this patent is extended or adjusted under 35 U.S.C. 154(b) by 348 days.

(21) Appl. No.: 15/110,760

(22) PCT Filed: Jan. 20, 2015

(86) PCT No.: PCT/EP2015/050938
§ 371 (c)(1),
(2) Date: Jul. 11, 2016

(87) PCT Pub. No.: WO2015/113859
PCT Pub. Date: Aug. 6, 2015

(65) Prior Publication Data
US 2016/0377223 A1    Dec. 29, 2016

(30) Foreign Application Priority Data
Jan. 28, 2014 (DE) .......................... 10 2014 100 992

(51) Int. Cl.
*F24C 15/16* (2006.01)
*F16B 12/38* (2006.01)

(52) U.S. Cl.
CPC .............. *F24C 15/16* (2013.01); *F16B 12/38* (2013.01); *F24C 15/168* (2013.01)

(58) Field of Classification Search
CPC ...... F24C 15/16; F24C 15/162; F24C 15/164; F24C 15/166; F24C 15/168;
(Continued)

(56) References Cited

U.S. PATENT DOCUMENTS 5,384,937 A * 1/1995 Simon .................. H02G 3/0443
211/181.1
6,193,434 B1 * 2/2001 Durin .................. H02G 3/0443
403/309
(Continued)

FOREIGN PATENT DOCUMENTS

DE    202008000887 U1    3/2008
DE    10 2010 021283 A1    11/2011
(Continued)

OTHER PUBLICATIONS

Nora Lindner, International Preliminary Report on Patentability (English translation), PCT/EP2015/050938, International Bureau of the World Intellectual Property Organization, dated Aug. 11, 2016.

*Primary Examiner* — Jonathan Liu
*Assistant Examiner* — Guang H Guan
(74) *Attorney, Agent, or Firm* — Paul & Paul

(57) ABSTRACT

A quick-fastening element is provided for fastening a guide rail to two adjacent horizontally extending bars arranged in a vertically superposed and parallel relationship. The quick-fastening element has a first holding portion adapted for a positively locking engagement with a first horizontally extending bar of the two adjacent horizontally extending bars, a second holding portion adapted for a positively locking engagement with a second horizontally extending bar of the two adjacent horizontally extending bars, and a connecting portion between the first and second holding portions and connecting the first and second holding portions. Each of the first and second holding portions extends from the connecting portion to one side in angled relationship to the connecting portion fastenably between the two adjacent horizontally extending bars. The connecting portion is configured for fastening the guide rail.

18 Claims, 16 Drawing Sheets

Figure 1A:
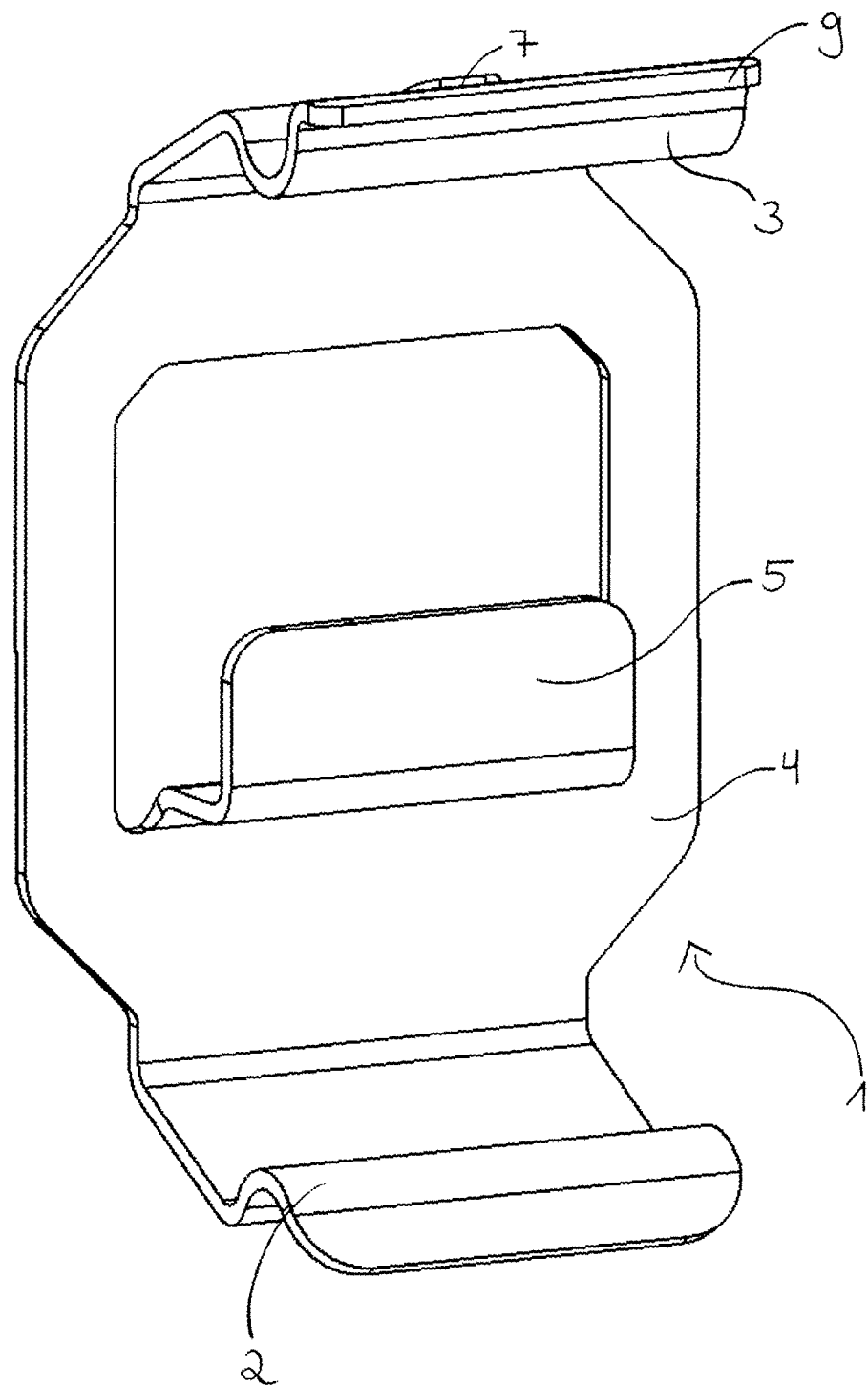

(58) Field of Classification Search
CPC ........... Y10T 24/44017; Y10T 403/606; F16B 7/0433; F16B 2/241; F16B 2/246
USPC ................................. 126/333, 339; 312/410
See application file for complete search history.

(56) References Cited

U.S. PATENT DOCUMENTS

| | | | |
|---|---|---|---|
| 6,401,939 B1 * | 6/2002 | Durin .................. | H02G 3/0443 |
| | | | 211/26 |
| 6,643,900 B2 * | 11/2003 | Hahrling ................ | A47B 55/02 |
| | | | 24/336 |
| 7,544,895 B2 * | 6/2009 | Penichon ............. | H02G 3/0443 |
| | | | 174/135 |
| 8,157,235 B2 * | 4/2012 | Quertelet ................. | H02G 3/32 |
| | | | 211/26 |
| 8,162,560 B2 * | 4/2012 | Wittgrebe ............... | F24C 15/16 |
| | | | 126/339 |
| 8,573,720 B2 * | 11/2013 | Wittgrebe ............. | A47L 15/504 |
| | | | 126/339 |
| 8,820,689 B2 * | 9/2014 | Reidt .................... | F24C 15/168 |
| | | | 24/563 |
| 9,078,517 B2 * | 7/2015 | Rehage ................ | F24C 15/168 |
| 2001/0044992 A1 | 11/2001 | Jahrling | |
| 2016/0377223 A1 * | 12/2016 | Heffel ..................... | F16B 12/38 |
| | | | 248/215 |
| 2019/0107291 A1 * | 4/2019 | Cetintas ................ | F24C 15/168 |

FOREIGN PATENT DOCUMENTS

| | | |
|---|---|---|
| EP | 1158185 A2 | 11/2001 |
| EP | 2487422 A1 | 8/2012 |
| WO | 2010/089553 A1 | 8/2010 |

\* cited by examiner

QUICK-FASTENING ELEMENT, GUIDE RAIL AND USE

CROSS-REFERENCE TO RELATED APPLICATION

This application is a 371 national stage application of International Application PCT/EP2015/050938, filed Jan. 20, 2015, and claims the priority of German Application No. 10 2014 100 992.4, filed on Jan. 28, 2014.

The present invention concerns a quick-fastening element for fastening a guide rail to two adjacent horizontally extending bars of a grid-like side portion, that are arranged in substantially vertically superposed and parallel relationship and are bent at an angle in their end region and a guide rail having such a quick-fastening element and a use of such a quick-fastening element.

STATE OF THE ART

For the insertion of supports for food to be cooked in particular higher-quality cooking ovens but also other cooking appliances like steam cookers have guide rails, in particular ball-mounted telescopic rails which are fastened to the side walls by way of grid-like side portions. Fixing of the guide rails to the grid-like side portions or the oven walls can be effected by welding or screwing or releasably by being suspended and/or clipped thereat. Releasable fastening of such guide rails to grid-like side portions has the advantages that the rails can be easily released from the grid-like side portion or the oven wall for cleaning or for re-fitting in another plane in the cooking appliance and can then be re-fastened thereto.

EP 1 158 185 B1 describes a quick-fastening element with which guide rails can be fitted to grid-like side portions in domestic appliances like dishwashers, ovens and so forth, wherein the quick-fastening element has an upper holding portion which in use at least partially embraces a first bar of a side portion and a lower holding portion which in use at least partially embraces a second bar of the side portion, that extends substantially parallel to the first bar, wherein provided between the upper and lower holding portions is a nose which in use bears against the second lower bar of the side portion, wherein the lower holding portion with the nose provides a snap-action connection for the second bar when the quick-fastening element is pivoted about the first bar for mounting the fastening element to the side portion, wherein provided between the lower and the upper holding portion is a second nose against which the first bar bears upon deflection of the first bar towards the second bar. The second nose is intended to provide that it retains the spacing between the two bars even when there is a considerable vertical loading, this being intended to prevent the bars from moving away from each other and thus release of the quick-fastening element. In addition the aim is to provide that a load on the quick-fastening element is uniformly distributed to both bars.

DE 20 2005 013 789 U1 also describes a quick-fastening element, wherein it is mounted to an upper and a lower grid bar of a side grid, for which purpose preferably both of the upper and lower grid bars of a pair of grid bars is/are sufficiently elastic and the spacing between the upper and lower grid bars can be reduced by applying a force in the region between the end portions of the grid bars and the elasticity of one or both of the grid bars provides a return force in the direction of the original spacing between the grid bars, wherein at least one quick-fastening element is/are provided on a guide rail when it has an upper holding portion which partially embraces an upper grid bar of a pair of grid bars from above and a lower holding portion which partially embraces the associated lower grid bar of the pair of grid bars from below, wherein a positively locking and force-locking connection is made between the grid bars and the quick-fastening element and the upper and the lower holding portions of the quick-fastening element are in a rigid relationship with each other in respect of their vertical spacing.

In both of the above-described forms of quick-fastening elements quick fitment to grid bars of a side portion is possible. They suffer from the disadvantage however that guide rails cannot be mounted thereto or can only be mounted thereto with difficulty, such that supports for food to be cooked of the same size as are used for the grid-like side portions without an additional guide rail can be placed on the guide rails. In addition the implementation of the quick-fastening elements in the interior of a cooking appliance takes up a great deal of space which is not available for guide rails, food supports and food material to be cooked.

OBJECT

The object of the present invention therefore is to provide a quick fastening which is simple and inexpensive to produce and with which the space within a cooking appliance is put to optimum use.

DESCRIPTION OF THE INVENTION

According to the invention that object is attained by a quick-fastening element of the kind set forth in the opening part of this specification, which has a first holding portion which is adapted for positively locking and/or force-locking engagement of the quick-fastening element with a first bar of the two adjacent bars, a second holding portion which is adapted for positively locking and/or force-locking engagement of the quick-fastening element with a second bar of the two adjacent bars, and a connecting portion arranged between the first holding portion and the second holding portion and connecting the holding portions, wherein the first and second holding portions extend from the connecting portion to one side in angled relationship fastenably between the bars of the pair of bars and in the fastened condition bear against mutually facing sides of the bars, wherein the connecting portion has a fastening portion for fastening the guide rail.

By virtue of the combination of two holding portions which are connected together by a connecting portion and which in the fastened condition bear against mutually facing sides of bars of a side grid the quick-fastening element extends in a vertical direction substantially between two horizontal bars. This configuration in which the quick-fastening element is clamped between the two pairs of bars in positively locking and/or force-locking relationship tolerates a considerably greater deviation in the spacing between the bars than is the case with the known quick-fastening elements. In addition, by virtue of the specific configuration of the quick-fastening element a fastening portion is provided between the holding portions, to which a guide rail can be fastened. By virtue of such a manner of fitting a guide rail the spacing between two vertically superposed and parallel, horizontally extending bars is put to optimum use to provide a supporting arrangement for a support for food to be cooked. In addition the position of the fastening portion on the connecting portion can be freely determined without limitations by the quick-fastening element insofar as the spacing between the first and second horizontal bars permits it, thereby providing on the one hand for optimum utilization of space and on the other hand a high degree of variability.

By virtue of the specific configuration of the quick-fastening element for fastening a guide rail it is also possible to provide, above and below the guide rail to be fastened and depending on the respective configuration of the quick-fastening element, to possibly also provide additionally sufficient space between the guide rail and the quick-fastening element for fitting further elements to the guide rail and/or the quick-fastening element. They include elements or devices for automatic retraction of the guide rail, synchronization of the guide rail, braking elements, hold-out means and hold-in means, and so forth.

In certain embodiments the fastening portion is a constituent part of the connecting portion, that is not delimited. In certain embodiments the fastening portion is a tab which is stamped out of the material of the connecting portion and which is designed for being optionally bent or pressed out. Depending on the space required and the shape and the width of a food support which is to be fastened by way of a guide rail with the quick-fastening element to the grid-like side portion the position of the fastening portion can be varied in that way relative to the connecting portion from which it is stamped out and optionally the fastening portion can also be a part of the connecting portion, which part is delimited by the stamping operation and does not project from the connecting portion. The latter is advantageous in particular for mounting guide rails in the form of a telescopic full-extension arrangement. Besides the inner and outer rails which are also present in the case of telescopic partial extension arrangements, such full-extension arrangements also additionally have a central rail and as a result are wider and higher.

The expression "to one side in angled relationship", in relation to the position of the holding portions relative to the connecting portion, denotes that both are arranged in angled relationship in relation to the connecting portion to the same side. In an embodiment in which the connecting portion is of a flat configuration in that case there is a kink or a rounded portion between the connecting portion and each of the holding portions. It is however not necessarily required for that purpose that the connecting portion and the first and second holding portions are shaped in one piece from one material.

In an embodiment the first and/or second holding portions are so designed that it/they comes/come into engagement in positively locking relationship with the first and/or second bar.

In an embodiment the bars are of a circular cross-section. In an embodiment disposed between the end regions of the bars is a central region which is the greatest extent of the horizontally extending bars. In certain embodiments both end regions of the bars are bent at an angle.

In an embodiment the quick-fastening element is elastically adapted for a reduction in the spacing between the first and second holding portions, said reduction being resiliently prestressed with the application of a force. By virtue of such an elastic configuration of the quick-fastening element overall and in particular of the connecting portion arranged between the first and second holding portions, there is provided a quick-fastening element which tolerates any fluctuations which occur in respect of the spacings between bars of grid-like side portions in a cooking appliance, in which respect nonetheless secure fastening of a guide rail to two adjacent bars is possible. That elasticity, irrespective of the configuration of the holding elements, provides a force-locking connection between the quick-fastening element and the two adjacent, substantially vertically mutually superposed and parallel, horizontally extending bars which are bent in an angled relationship in their end region.

In an embodiment the connecting portion is substantially plate-shaped and the fastening portion for fastening the guide rail is in the form of a tab-shaped portion projecting from the plane of the plate in a cranked configuration. Preferably a region of the fastening portion extends substantially parallel to a plane in which the plate-shaped connecting portion is disposed, that region being provided for mounting the guide rail. With such a configuration it is possible, by adaptation of the crank configuration by which the fastening portion is arranged in displaced relationship with the connecting portion, to adapt the position of a guide rail fastened with the quick-fastening element, in relation to the bars, to the respective configuration of the side grid and the space available in the appliance. By virtue of the crank configuration further adaptation to the nature of the guide rail to be used but also to the configuration of a food support intended for same is possible. For example telescopic partial extension arrangements are narrower than telescopic full-extension arrangements so that, when using partial extension arrangements, the above-described crank configuration of the portion is generally required whereas when fitting a full-extension arrangement no or a less heavily pronounced protrusion of the fastening portion from the connecting portion is advantageous.

In an embodiment the first and/or second holding portion is adapted to the contour of the respective horizontal bar against which that holding portion bears, at least in regions which are intended for engagement with the bars. In that way it is particularly easily possible to provide for positively locking engagement with the respective bar. In an embodiment the first and/or second holding portion in the case of a bar of a substantially circular cross-section are adapted to the contour of the bar along a circular arc or a plurality of circular arcs, wherein preferably the circular arc has a center point angle which is in the range of between approximately 10° and approximately 170°, preferably between approximately 30° and approximately 140°.

In an embodiment the quick-fastening element at the first and/or second holding portion has at least one latching nose which can be brought into engagement with the respective first and/or second bar. Preferably the at least one latching nose projects from the material of the respective holding portion and is stamped out of same. Such a latching nose permits good positively locking engagement of the holding portion with a bar.

In an embodiment the first and/or the second holding portion has an actuating tab which adjoins the holding portion at its side remote from the connecting portion, preferably the actuating tab being a prolongation of the holding portion. By means of such an actuating tab, mounting of a guide rail with the quick-fastening element to a grid-like side portion is made easier as it facilitates insertion and the application of the necessary force for elastically deforming the quick-fastening element. In particular that also facilitates removal of the quick-fastening element from the grid-like side portion, insofar as the spacing between the first and second holding portions is reduced by pressing on or pulling on the actuating tab, in such a way that at least the holding portion on which the actuating tab is disposed can be disengaged from the respective bar. The actuating tab provides an operating surface which can be readily gripped with several fingers or actuated with one finger.

In an embodiment the connecting portion is at least portion-wise of a substantially plate-shaped configuration, wherein provided at one or both mutually opposite side edges of the connecting portion are tabs which extend substantially in or parallel to the plane of the plate-shaped connecting portion or extending in an angled relationship with said plane. The term "side edges" in that respect denotes the edges of the connecting portion which are not adjoined by a holding portion. In the case of a quick-fastening element mounted to two horizontal bars of a grid-like side portion, such a tab bears against a vertically extending bar to which at least one end region of the horizontally extending bars which are bent at an angle is connected. That provides for stabilization of the quick-fastening element, by which deflection of the connecting portion and as a result release from the grid-like side portion is prevented, in particular under a loading. In an embodiment for that purpose the substantially plate-shaped connecting portion bears against a notional plane which extends parallel to the plane in which the central regions of the horizontally extending bars are disposed, and in which the vertical bar lies, so that the tab or tabs extends/extend in the plane of that connecting portion. In certain embodiments, if the connecting portion does not extend within that plane, there are provided crank configurations in the tab/tabs so that in the fastened condition of the quick-fastening element same is/are in contacting engagement with a vertical bar.

In embodiments in which the tab or tabs extends/extend in angled relationship with the plane of the plate-shaped connecting portion, an abutment is provided at the above-described vertical bar, whereby lateral slippage of the quick-fastening element is prevented along a central region, between the end regions, of the horizontal bar/bars.

In an embodiment there are provided two such tabs which face in opposite directions from the connecting portion. In the case of quick-fastening elements which have two tabs arranged at mutually opposite side edges of the connecting portion, a tab bears against a vertical bar in a condition of being mounted to a grid-like side portion, while in certain embodiments the other tab does not perform any function when fitted in that way to a guide rail. It is however made possible in that fashion to provide quick-fastening elements which are mounted in the region of both ends of an elongate guide rail and which can be used for fastening thereof to a grid-like side portion, in which case they respectively perform the same functions or functions which supplement each other when the two tabs are of differing design configurations.

In an embodiment at least one of the holding portions (2, 3) at one or both mutually opposite sides has at least one abutment tab of an angled configuration. Preferably the abutment tab adjoins a region of the holding portion that is closer to the connecting portion than the region intended for engagement with a bar. Such an abutment tab permits positioning of the guide rail along the horizontal bars of the grid-like side portion and at the same time in use prevents slippage of the quick-fastening element and the guide rail along a central region of the bars. In an embodiment such an abutment tab for that purpose only comes into engagement with the angled end region of the horizontal bar, at the side that faces towards the quick-fastening element.

In an embodiment the quick-fastening element is shaped with mirror symmetry relative to a plane of symmetry extending along a connecting direction between the first and second holding elements, through the prolongation portion. Such quick-fastening elements can be fitted in the region of both ends of an elongate guide rail and then provide the same functionality in relation to mounting to a grid-like side portion at both ends. It is not necessary for that purpose to produce different quick-fastening elements.

In an embodiment on the connecting portion the quick-fastening element has one, two, three or four fastening portions for mounting a corresponding number of guide rails. The fastening portions are preferably arranged in mutually superposed relationship. Such a configuration, particularly with grid-like side portions which involve large spacings between adjacent bars, makes it possible to provide different positions for fastening a guide rail or to fasten a plurality of guide rails to a grid-like side portion by means of a quick-fastening element.

In an embodiment the holding portions and the connecting portion and possibly transitional portions are in one piece, preferably being formed from steel or stainless steel sheet. Preferably the entire quick-fastening element is made in one piece, preferably from steel or stainless steel sheet.

The object of the invention is further attained by a guide rail having at least one above-described quick-fastening element. In certain embodiments the guide rail is a telescopic full-extension arrangement, that is to say in the fully extended condition it is of a length which corresponds to more than twice the length in the fully collapsed condition. In other embodiments the guide rail is a telescopic partial extension arrangement in which the length in the fully extended condition is somewhat less than double the length in the fully collapsed condition. In addition to the inner and outer rails which are also present in the partial extension arrangement, a telescopic full-extension arrangement also has at least one central rail.

In an embodiment the guide rail has two quick-fastening elements, wherein a respective quick-fastening element is disposed in the region of an end of the elongate guide rail while the further quick-fastening element is disposed in the region of the further end of the elongate rail. In that respect the term "disposed in the region of an end" signifies that the connection between a quick-fastening element and a guide rail is in a region which is spaced from the respective end of the guide rail at between 1% and 30% in relation to the overall length of the guide rail, preferably between 2% and 10%. In certain embodiments a quick-fastening element is arranged in the region of an end of the elongate guide rail while the further element is arranged spaced in relation to the first element but not necessarily in the region of the other end.

By virtue of the specific configuration of the guide rail with at least one above-described quick-fastening element it is possible to provide, above and below the guide rail and in certain embodiments also between the guide rail and the quick-fastening element, additionally sufficient space for fitting further elements to the guide rail and/or the quick-fastening element. They include elements or devices for automatic retraction of the guide rail, synchronization of the guide rail, braking elements, hold-out devices and hold-in devices, and so forth.

In addition the object of the invention is attained by the use of an above-described quick-fastening element for fastening a guide rail to a grid-like side portion of an appliance, preferably a side grid of an oven.

The term "grid-like side portion" as is used here relates herein to side grids which are usually arranged in ovens or other cooking appliances and which have two or more vertical bars connected by horizontal bars. That term however also includes grid-like side portions in which horizontally extending bars are connected directly to the lateral internal wall or oven wall of a cooking appliance, without implementing a complete side grid. In certain embodiments the grid-like side portion includes vertically extending bars to which the horizontally extending bars are connected in the region of their ends.

In an embodiment the grid-like side portion has mutually superposed horizontal pairs of bars, wherein the spacing in the vertical direction between the horizontal bars of a pair of bars is less than the spacing between horizontal bars of adjacent pairs of bars and wherein the quick-fastening element is introduced between the horizontal bars of adjacent pairs of bars. In that way the greater spacing between horizontal bars of adjacent pairs of bars is put to optimum use for fitting one or more guide rails to the grid-like side portion. In particular it is possible in that way to mount one, two, three or four guide rails between bars of adjacent pairs of bars.

FIGURES

Further advantages, features and embodiments of the present invention are described hereinafter by means of a number of embodiments by way of example with reference to the accompanying Figures, in which respect they are only by way of example and do not limit the scope of protection.

Figure 1B:
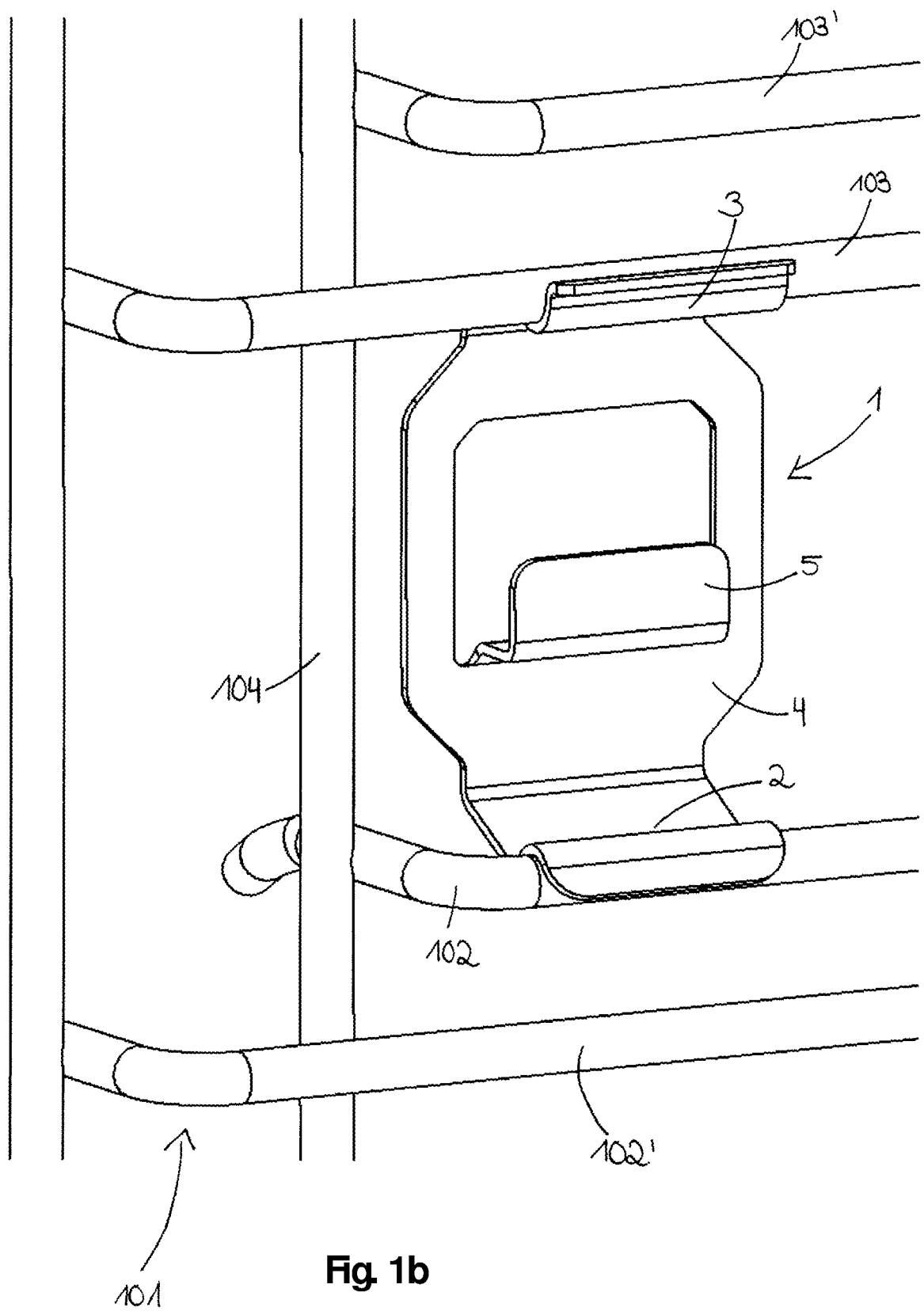
Figure 1C:
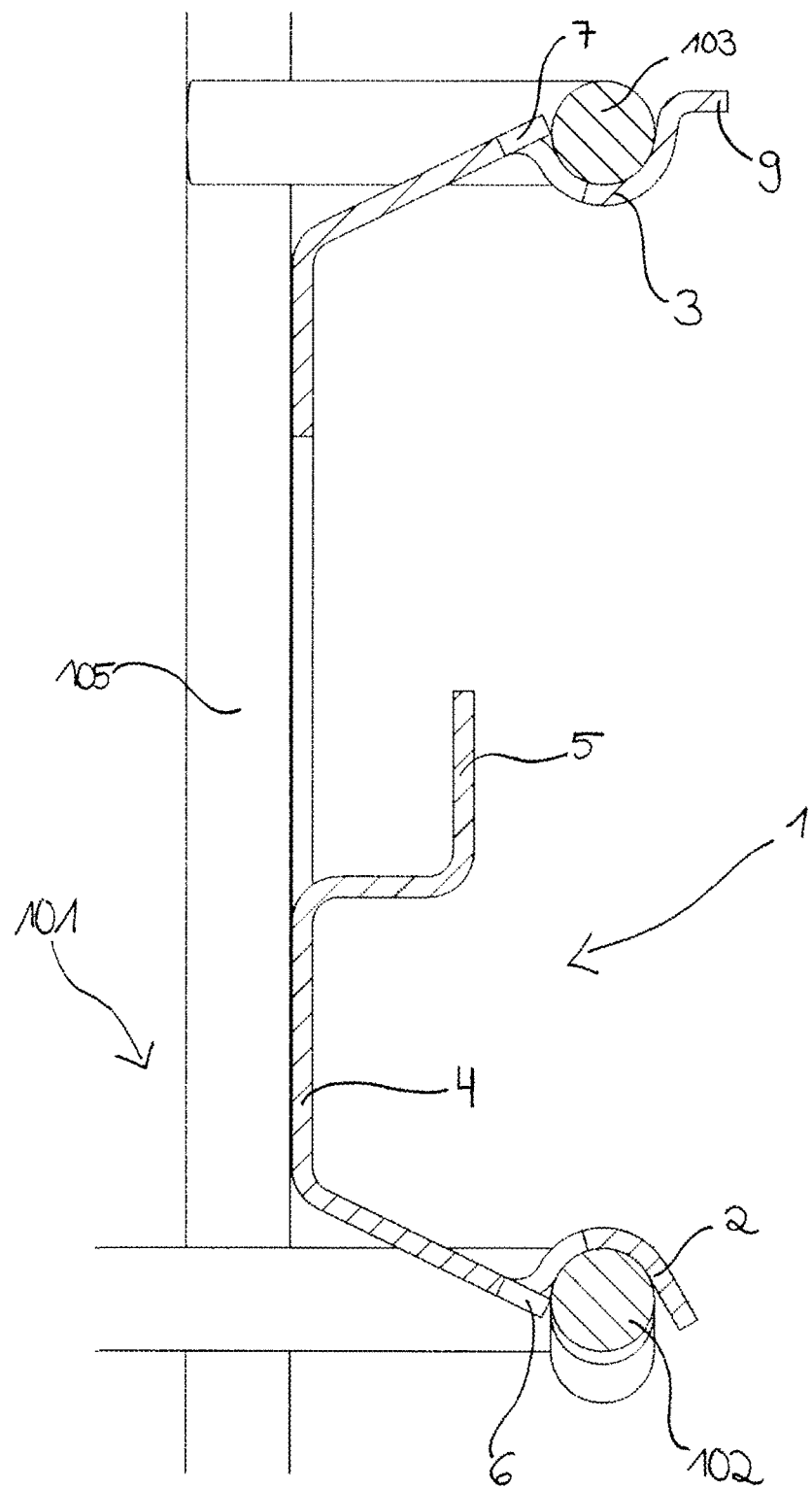
Figure 2A:
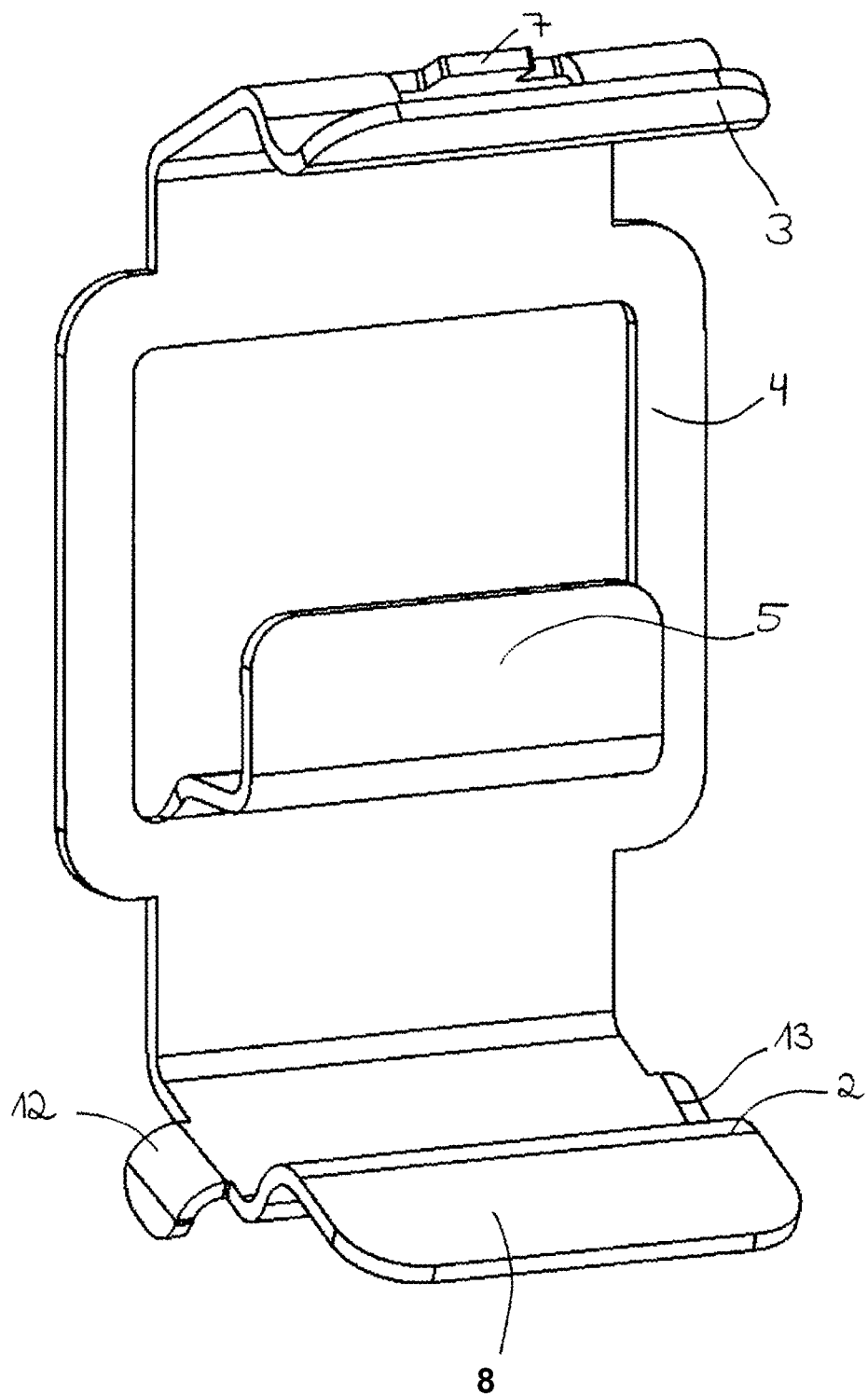
Figure 2B:
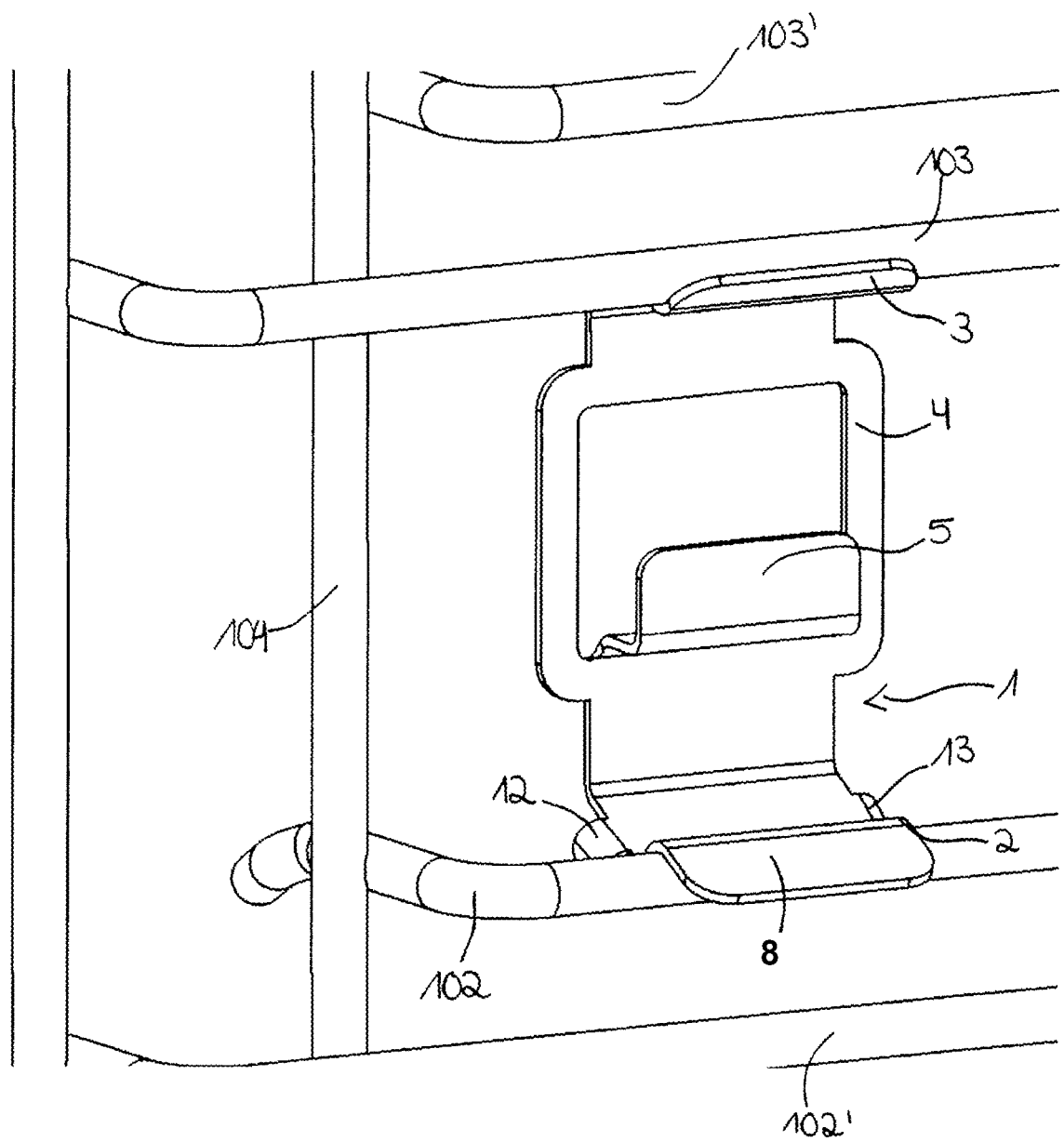
Figure 2C:
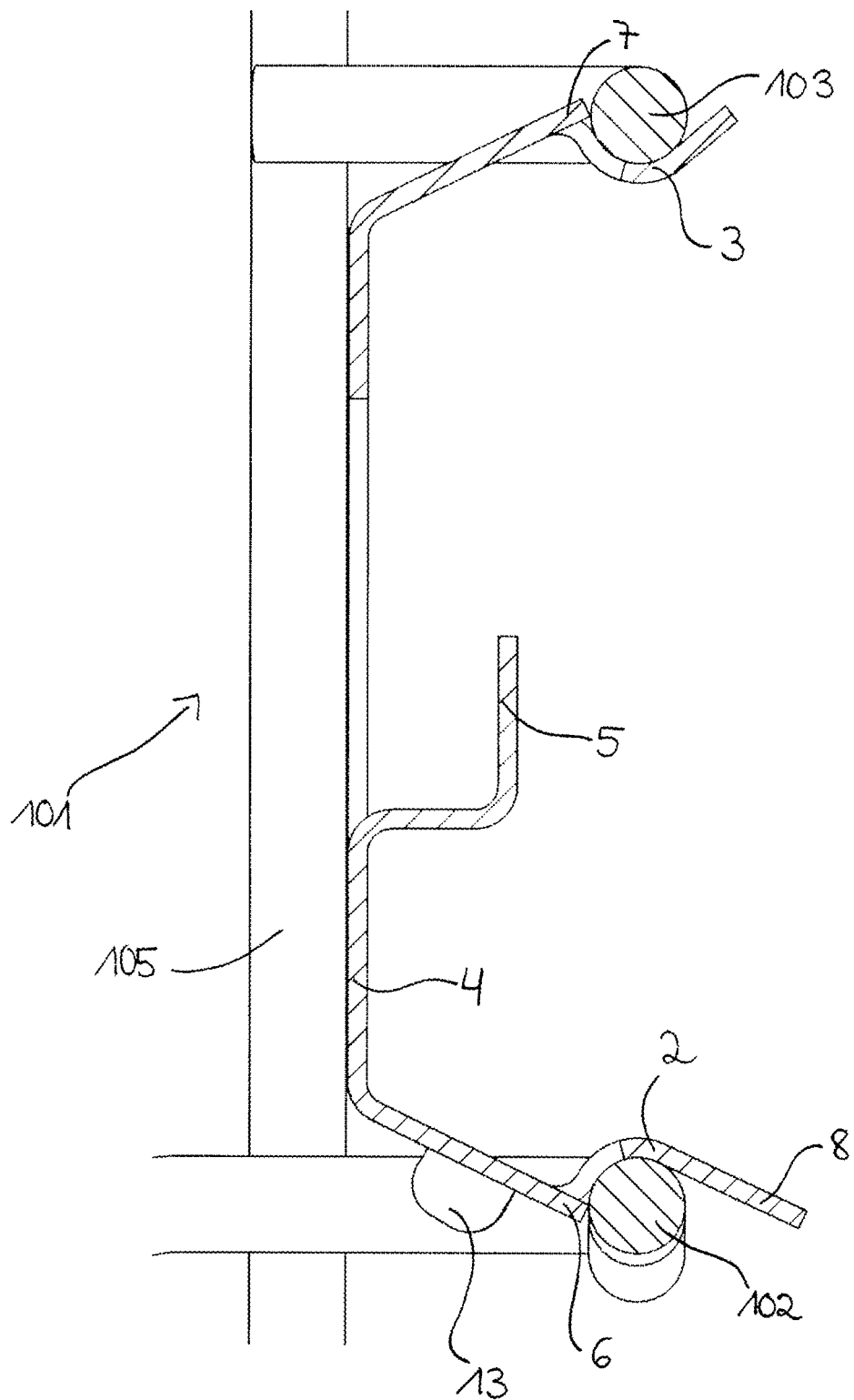
Figure 3A:
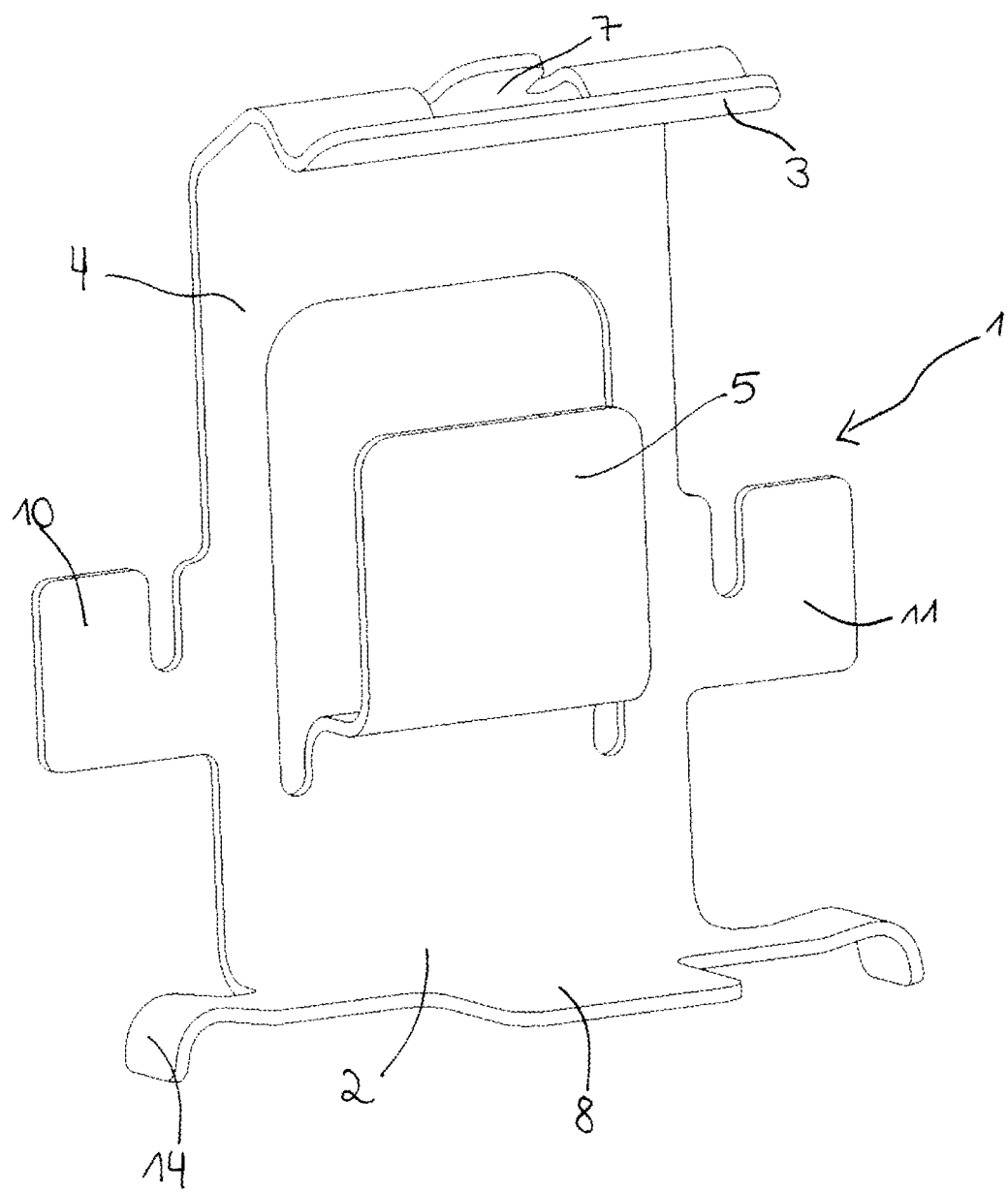
Figure 3B:
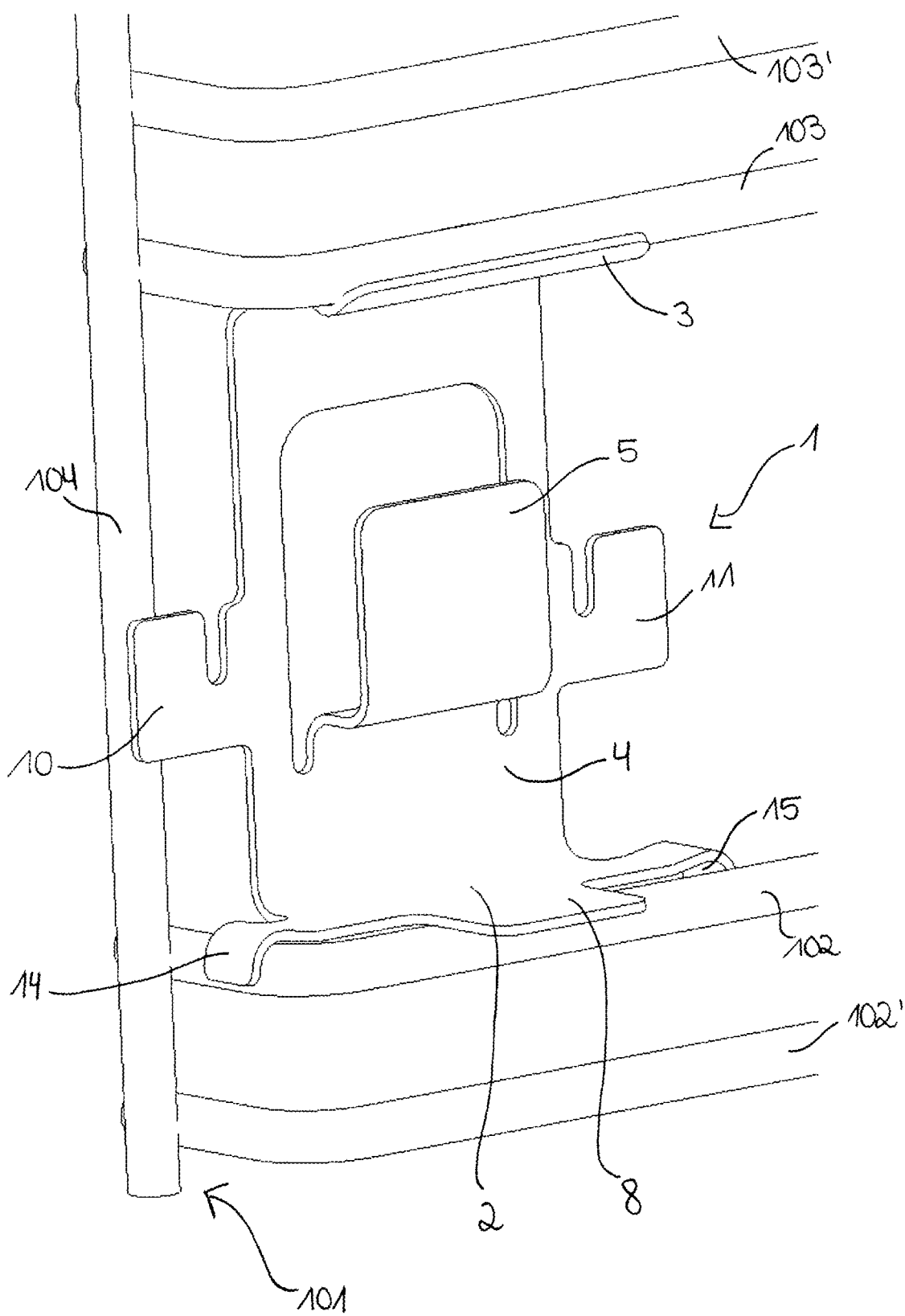
Figure 3C:
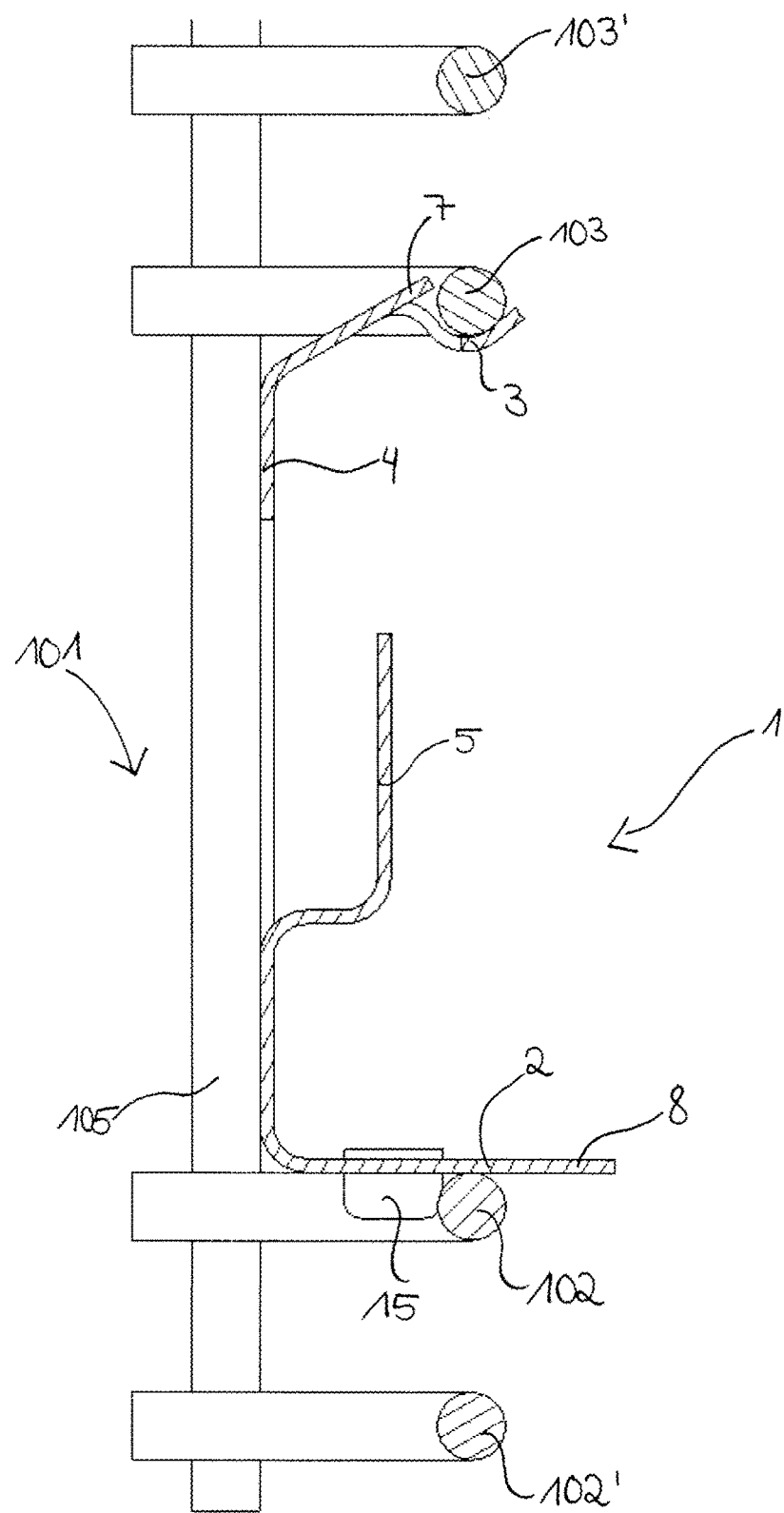
Figure 3D:
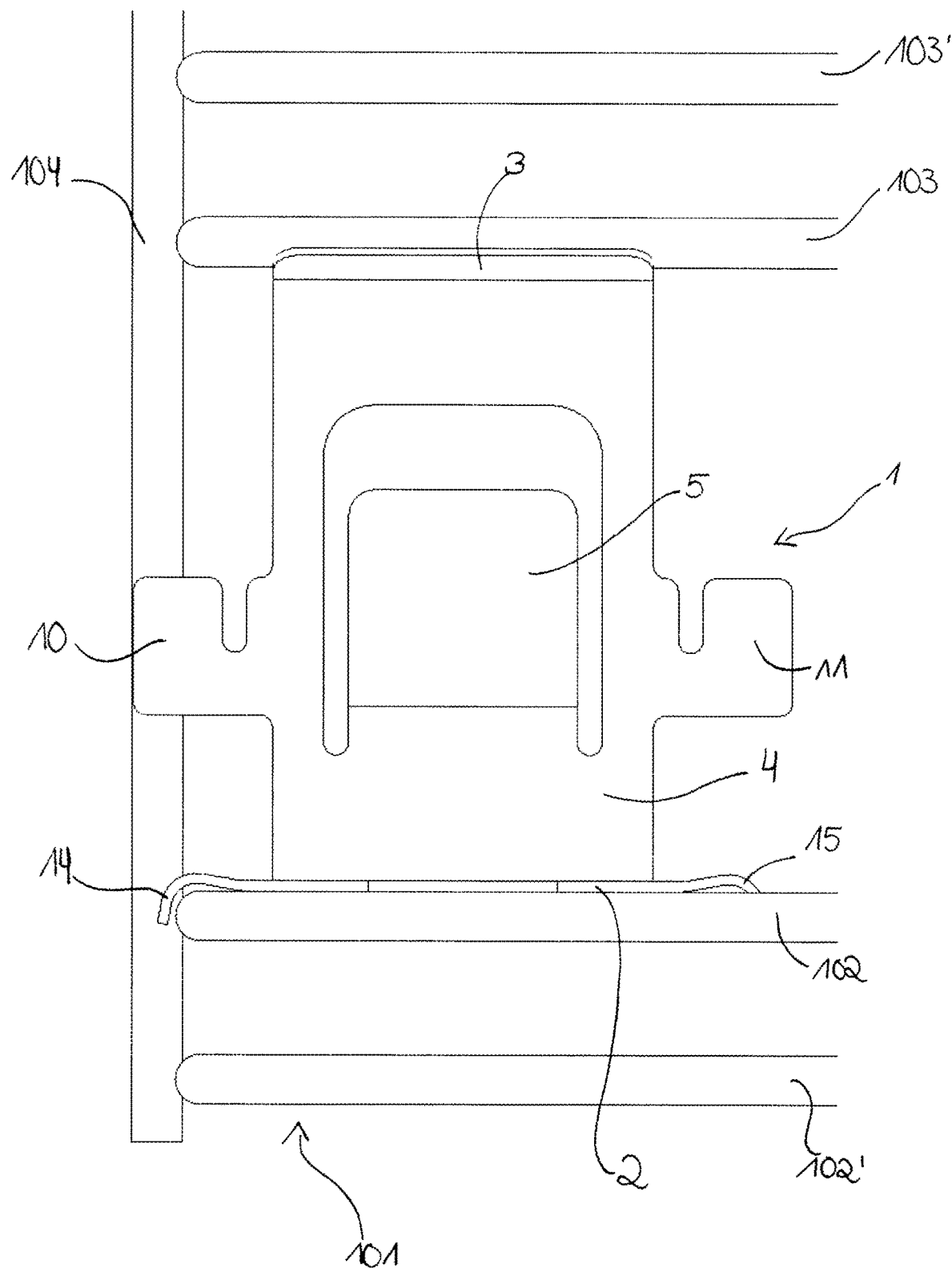
Figure 4A:
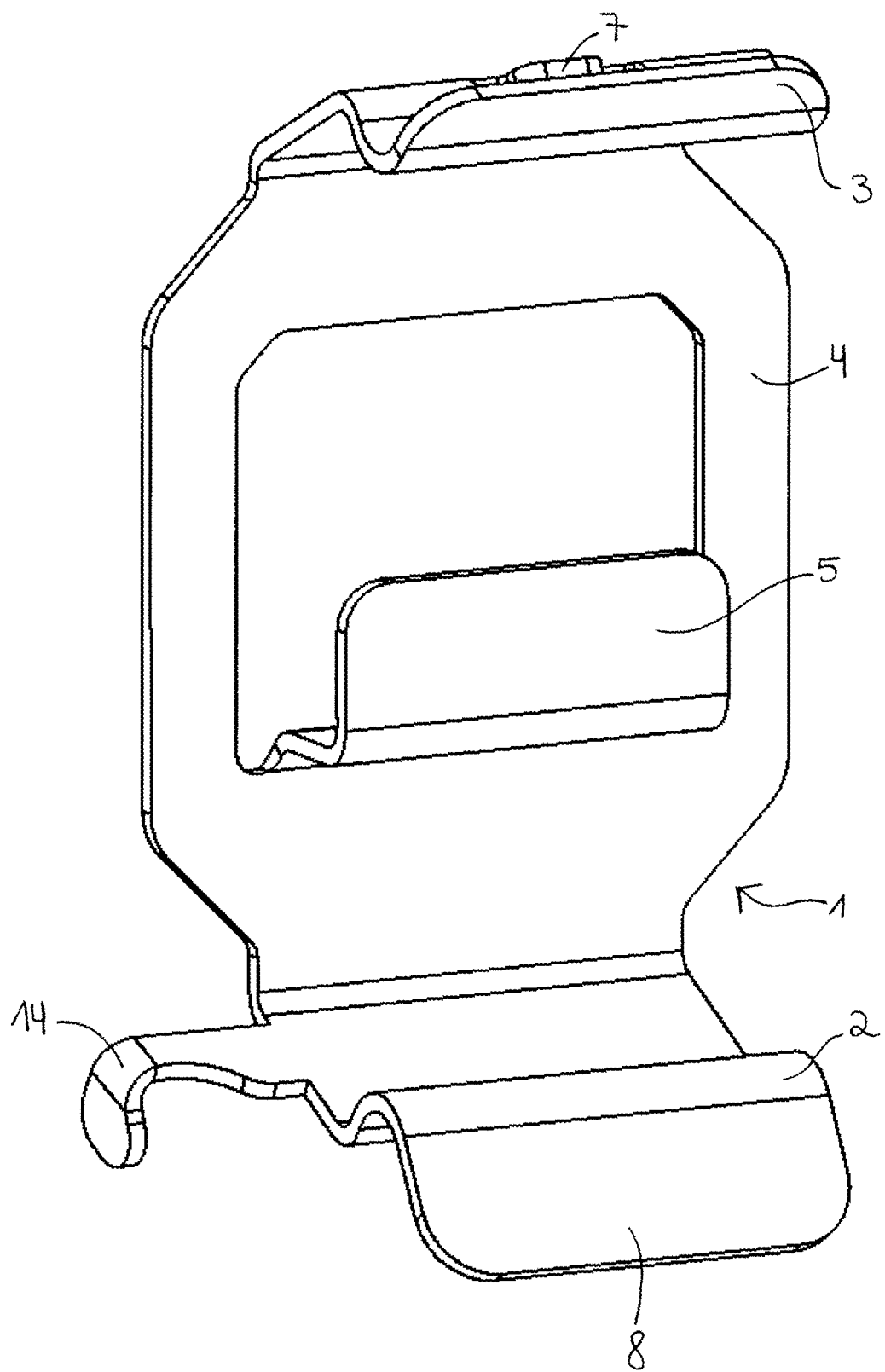
Figure 4B:
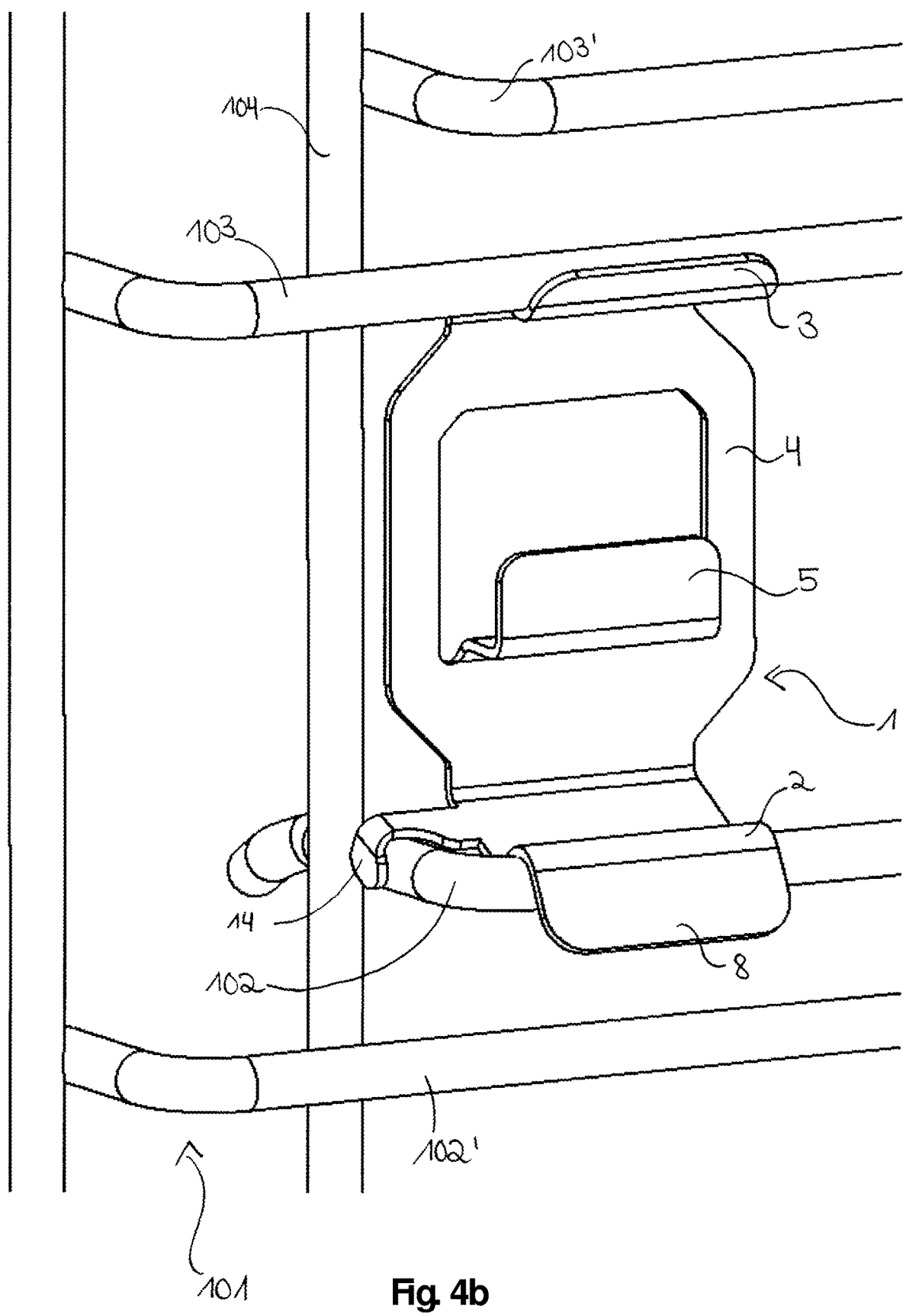
Figure 4C:
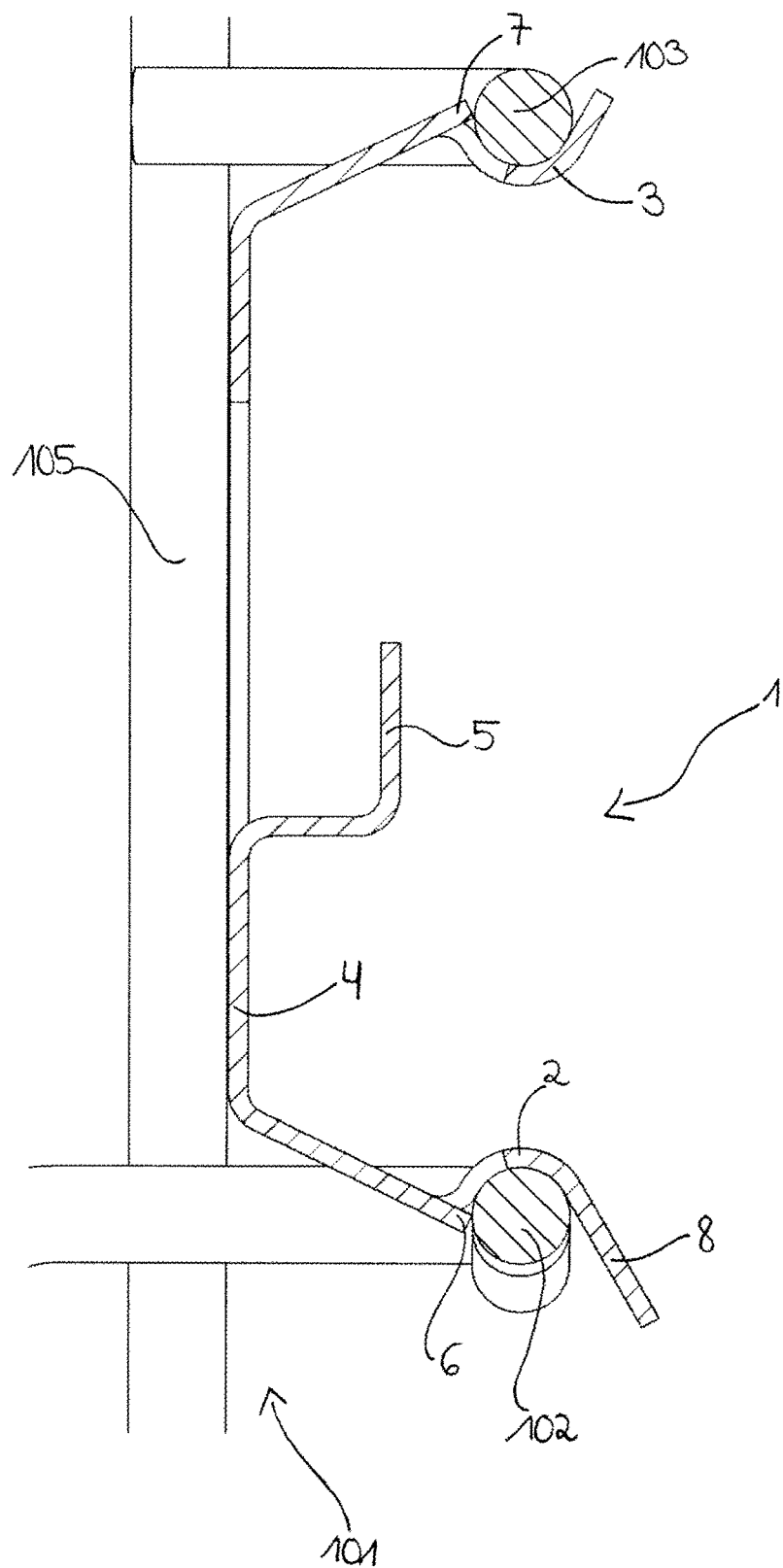
Figure 5:
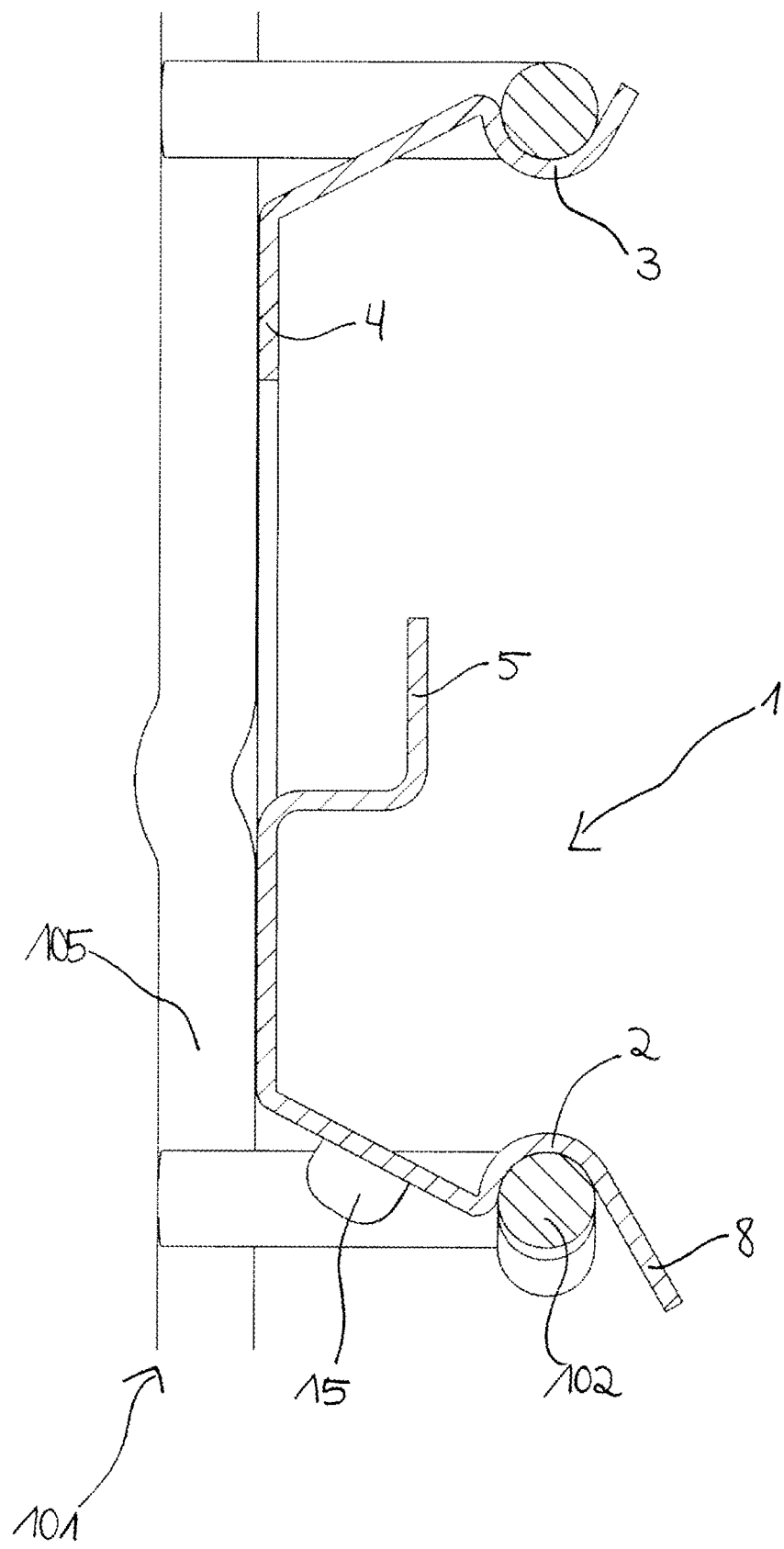
Figure 6:
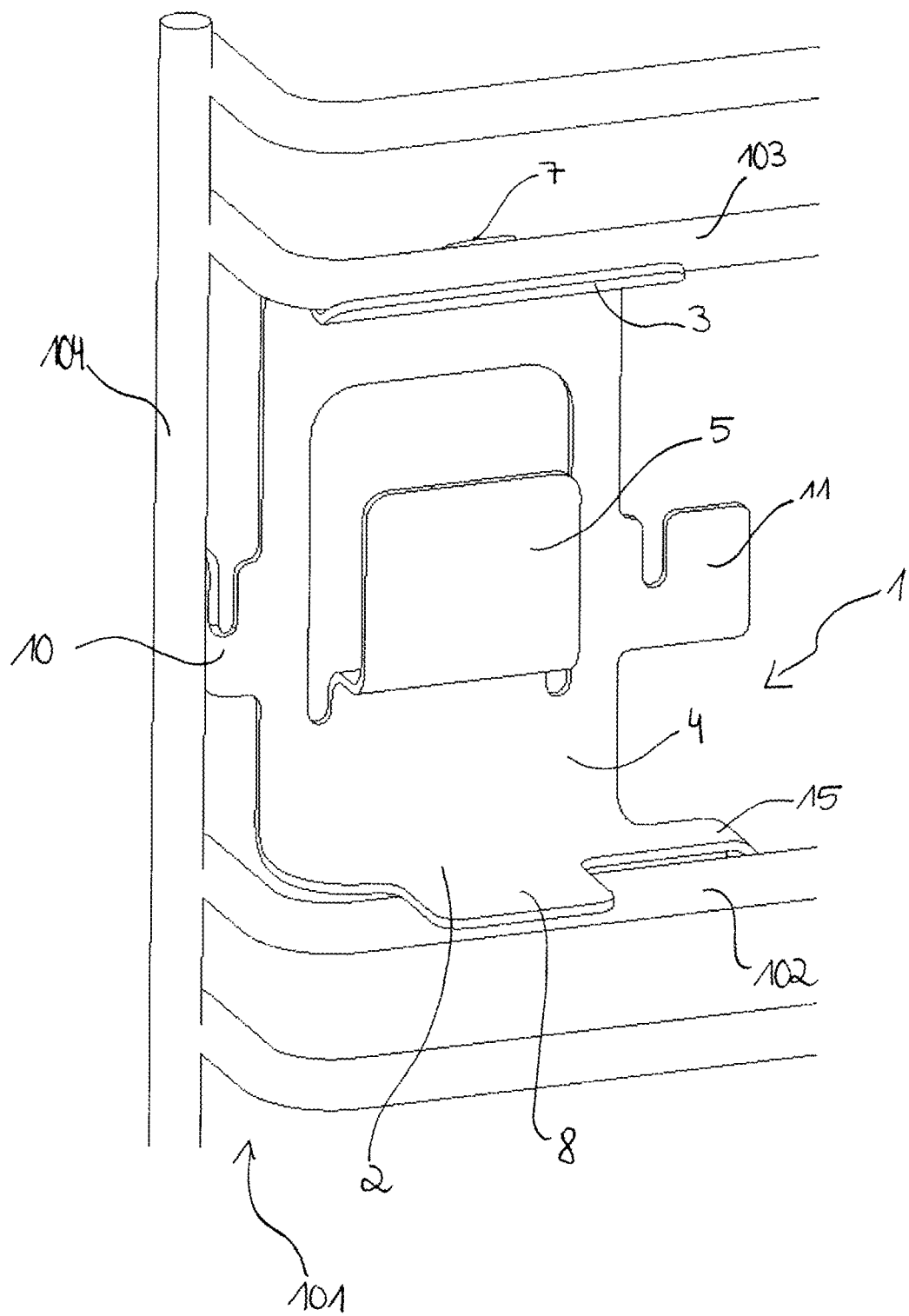
Figure 7:
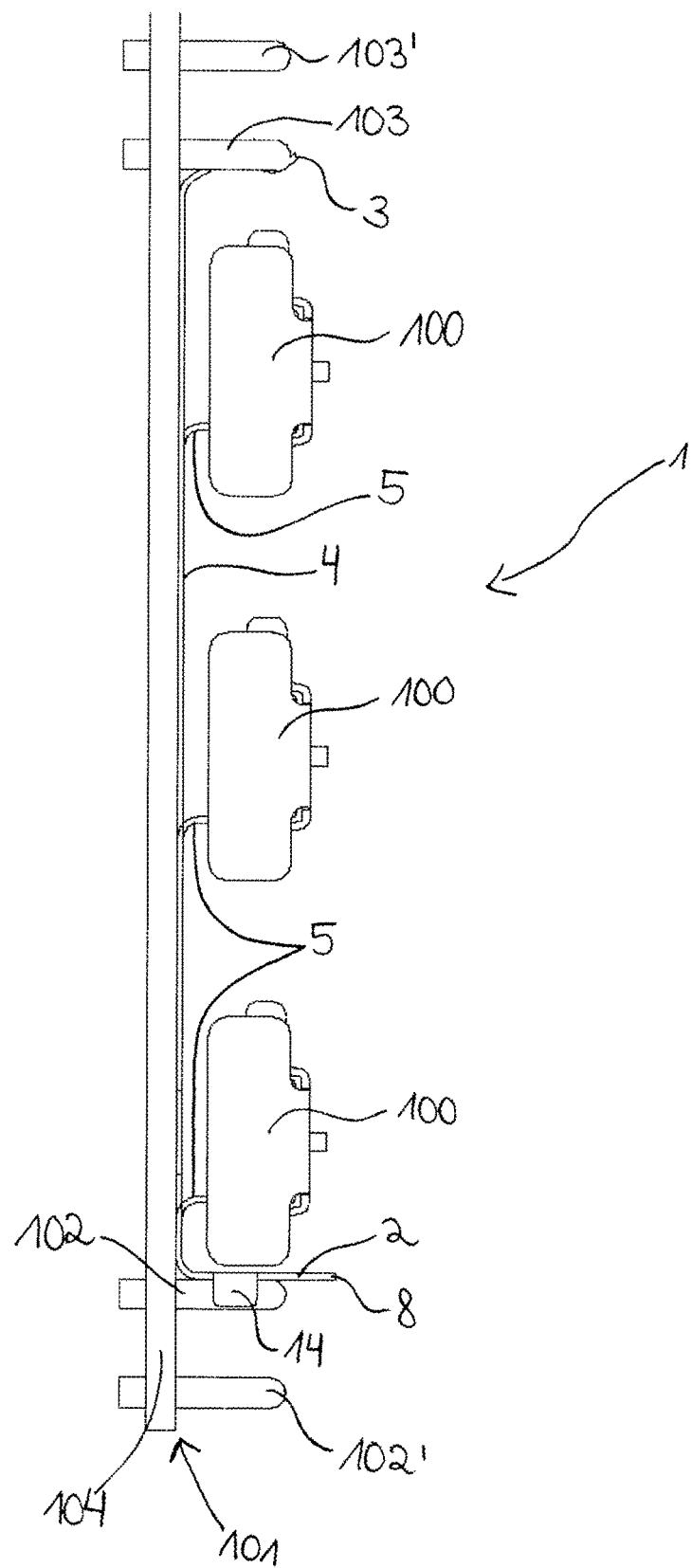

In the Figures:

FIG. 1a shows a perspective view inclinedly from the front, in relation to a viewer looking into an interior of a cooking appliance, of a quick-fastening element according to the invention, FIG. 1b shows the quick-fastening element of FIG. 1a in a condition of being mounted to a grid-like side portion, FIG. 1c shows a cross-section of the quick-fastening element of FIGS. 1a and 1b in a condition of being mounted to a grid-like side portion, FIG. 2a shows a perspective view inclinedly from the front, in relation to a viewer looking into an interior of a cooking appliance, of a further embodiment of a quick-fastening element according to the invention, FIG. 2b shows the quick-fastening element of FIG. 2a in a condition of being mounted to a grid-like side portion, FIG. 2c shows a cross-section of the quick-fastening element of FIGS. 2a and 2b in a condition of being mounted to a grid-like side portion, FIG. 3a shows a perspective view inclinedly from the front, in relation to a viewer looking into an interior of a cooking appliance, of a further embodiment of a quick-fastening element according to the invention, FIG. 3b shows the quick-fastening element of FIG. 3a in a condition of being mounted to a grid-like side portion, FIG. 3c shows a cross-section of the quick-fastening element of FIGS. 3a and 3b in a condition of being mounted to a grid-like side portion, FIG. 3d shows a plan view of the quick-fastening element in a condition of being mounted to a grid-like side portion, FIG. 4a shows a perspective view inclinedly from the front, in relation to a viewer looking into an interior of a cooking appliance, of a further embodiment of a quick-fastening element according to the invention, FIG. 4b shows the quick-fastening element of FIG. 4a in a condition of being mounted to a grid-like side portion, FIG. 4c shows a cross-section of the quick-fastening element of FIGS. 4a and 4b in a condition of being mounted to a grid-like side portion, FIG. 5 shows a cross-sectional of a further embodiment of a quick-fastening element according to the invention, FIG. 6 shows a perspective view inclinedly from the front, in relation to a viewer looking into an interior of a cooking appliance, of a further embodiment of a quick-fastening element according to the invention, in a condition of being mounted to a grid-like side portion, and FIG. 7 shows a lateral plan view of a quick-fastening element according to the invention with guide rails in a condition of being mounted to a side grid.

In FIGS. 1 through 7 mutually corresponding elements are denoted by the same references even if they are not necessarily identical in the various embodiments.

The quick-fastening element 1 shown in FIGS. 1a, 1b and is has a first holding portion 2 and a second holding portion 3 connected by a connecting portion 4 arranged between the first and second holding portions. Disposed on the connecting portion 4 is a fastening portion 5 which projects in cranked relationship from the substantially plate-shaped connecting portion 4 and is of a tab-like configuration. The fastening portion extends substantially parallel to a plane in which the connecting portion lies. It is also possible in this view to see a latching nose 7 on the holding portion 3.

It can be seen from FIG. 1b that the quick-fastening element 1 is fastened between the horizontal bars 102 and 103, wherein the bar 102 is the upper bar of a pair of bars 102 and 102' of a grid-like side portion 101 and the bar 103 is the lower bar of a pair of bars 103 and 103' of the grid-like side portion.

The cross-section shown in FIG. 1c through the quick-fastening element 1 of FIG. 1a is a view of a section which extends substantially through the mirror plane of the mirror-symmetrical quick-fastening element 1 and thus also perpendicularly to a longitudinal extent of the central regions of the horizontal bars. This view clearly shows that the first holding portion 2 and the second holding portion 3 are respectively in positively locking engagement with the mutually adjacent horizontal bars 102 and 103, the latching noses 6 and 7 making a contribution to the positively locking engagement. In addition the second holding portion 3 has an actuating tab 9 formed by a prolongation of the second holding portion. It is possible in particular by means of that actuating tab to easily remove the quick-fastening element 1 fastened to a grid-like side portion 101 from the side portion 101, in which case firstly the holding portion 3 is moved out of engagement with the bar 103 by pressing the actuating tab 9 downwardly and thereafter or approximately at the same time a pivotal movement is effected about the axis formed by the bar 102 and the quick-fastening element can be removed alone or with a guide rail mounted thereto, from the grid-like side portion. Fitting the quick-fastening element 1 to the grid-like side portion 101 can be effected in this embodiment by simply pressing the quick-fastening element in between the two bars 102 and 103, making use of the elasticity of the connecting portion 4.

FIGS. 2a, 2b and 2c show a further embodiment of a quick-fastening element 1 according to the invention. The views or perspectives shown in FIGS. 2a, 2b and 2c are substantially the same as those in FIGS. 1a, 1b and 1c. As in the embodiment in FIG. 1 the quick-fastening element 1 has a first holding portion 2 and a second holding portion 3, between which is arranged a connecting portion 4 on which a fixing portion 5 is disposed. There is also a latching nose 7 on the holding portion 3. In addition this embodiment at mutually opposite sides of the first holding portion 2 has abutment tabs 12 and 13 which, when the quick-fastening element is mounted to a grid-like side portion 101 with horizontal bars 102 and 103 having angled end regions, can bear against the angled end regions of the bar, in which case contact in the position shown in FIG. 2b can be implemented by the tab 12 against one side of the angled end region of the bar 102, which faces towards the quick-fastening element. With such a configuration the tabs 12 and 13 do not embrace the angled end region of a horizontal bar, in a condition of being mounted to a grid-like side portion.

It can be seen from FIG. 2b that the quick-fastening element 1 is fastened between the horizontal bars 102 and 103, wherein the bar 102 is the upper bar of a pair of bars 102 and 102' of a grid-like side portion 101 and the bar 103 is the lower bar of a pair of bars 103 and 103' of the grid-like side portion.

FIG. 2c shows a cross-section through the quick-fastening element, using the same section plane as in Figure is for the sectional view. It will be clearly seen from this view that both the first holding portion 2 and also the second holding portion 3 have latching noses 6 and 7 which, besides the shape of the holding portions 2 and 3, contribute to positively locking engagement with the bars 102 and 103. In addition this embodiment has an actuating tab 8 which is a prolongation of the holding portion 2 at its side facing away from the connecting portion. Similarly to the foregoing description relating to FIG. 1c the quick-fastening element can be easily removed from the side grid by means of that actuating tab. In the removal procedure firstly the holding portion 2 is moved out of engagement with the bar 102 by lifting the actuating tab 8, whereby generally a pivotal movement about the axis formed by the bar 103 takes place at the same time. In addition, with this embodiment, for removal of the quick-fastening element 1 from the side grid 101, the abutment tabs 12 and 13 have to be lifted by actuation of the actuating tab 8 to such an extent that they can be pushed over the bar 102. Conversely, those abutment tabs 12 and 13 also have to be first pushed over the bar 102, when fitting the quick-fastening element. The first tab 12 then comes into positively locking engagement with the lower bar 102. Then the second tab 13 is brought into engagement with the upper bar 103 by simply pressing it in. The connecting portion 4 is elastic for that purpose.

FIGS. 3a, 3b, 3c and 3d show a further embodiment according to the invention of a quick-fastening element 1. The quick-fastening element 1 has a first holding portion 2 which is substantially plate-shaped and against which the bar 102 bears. That holding portion is adjoined by an actuating tab 8 which, in spite of a different configuration, performs substantially the same function as the corresponding actuating tab in FIGS. 2a, 2b and 2c. In addition the first holding portion 2 has abutment tabs 14 and 15 at opposite sides. Those tabs are designed for bearing against an angled end region of the first horizontal bar 102, wherein the abutment tab 14 of the first holding portion 2, in the position shown in FIG. 3b of being mounted to a side grid, comes into engagement with an angled end region of the first horizontal bar 102, wherein the abutment tab is in contact with a side of the horizontal bar, that faces away from the quick-fastening element, when the quick-fastening element is moved away from that end region along a central region of the bar 102. By virtue of suitable bending the abutment tab 14 is so designed that it does not come into contact with the bar 102 in other respects. That can be seen clearly in particular from FIG. 3d. Under a normal loading on the quick-fastening element, for example due to a filled food support which rests on a guide rail fixed thereto by way of the fastening portion 5, the abutment tab 14 does not rest on the angled end region of the bar 102. The abutment tab 15 is of the same configuration as the abutment tab 14, but does not come into engagement with an angled end region of a horizontal bar in the position of the quick-fastening element 1 shown in FIG. 3b. It bears with an edge against a central region of the bar 102 however, whereby it contributes to the positively engagement of the holding portion 2 with the bar 102. The quick-fastening element 1 shown in FIGS. 3a, 3b, 3c and 3d has tabs 10, 11 at mutually opposite side edges of the connecting portion 4. It can be clearly seen from FIG. 3b that the tab 10 bears against the vertical bar 104 and thus additionally supports fastening of the quick-fastening element to the grid-like side portion and prevents unintended bending of the connecting portion 4 upon a heavy loading on the guide rail, for example due to a filled food support. In the condition shown in FIG. 3b of being mounted to a side grid the tab 11 is not in engagement with a vertical bar, that however would be effected similarly to the abutment tab 15 at the vertical 105 when the quick-fastening element would be in the region of the further end regions of the bars 102 and 103, that are not shown in FIG. 3b and which can be seen in FIG. 3c behind the quick-fastening element, and would there be mounted to the grid-like side portion 101. It can also be seen from FIGS. 3b, 3c and 3d that the quick-fastening element 1 is fastened between the horizontal bars 102 and 103, the bar 102 being the upper bar of a pair of bars 102 and 102' of a grid-like side portion and the bar 103 being the lower bar of a pair of bars 103 and 103' of the grid-like side portion.

In particular the view in FIG. 3c clearly shows that the lower holding portion 2 is prolonged, forming an actuating tab 8. The tab 15 bears with an edge against the central region of the lower bar 102 and leads to positively locking engagement of the holding portion 2 with that bar. In addition the upper holding portion 3 has a latching nose 7.

The quick-fastening element 1 shown in FIGS. 4a, 4b and 4c has a first holding portion 2 and a second holding portion 3 for engagement with the horizontal bars 102 and 103 which extend parallel and in adjacent relationship. The connecting portion 4 which connects the holding portions and which is disposed between them has a fastening portion 5.

In addition at one side the lower holding portion 2 has an abutment tab 14 which, in the condition shown in FIG. 4b of being mounted to a grid-like side portion, extends above and portion-wise around an angled end region of the bar 102, the abutment tab 14 bearing against the angled end region at a side facing away from the quick-fastening element.

FIG. 4b shows that the quick-fastening element 1 is fastened between the horizontal bars 102 and 103, the bar 102 being the upper bar of a pair of bars having the bars 102 and 102' of a grid-like side portion 101 and the bar 103 being the lower bar of a pair of bars having the bars 103 and 103' of the grid-like side portion.

FIG. 4c shows a cross-section of this embodiment in a condition of being fastened to a side grid, the section plane of the Figure substantially corresponding to that described in relation to FIG. 1c. The bars 102 and 103 to which the quick-fastening element is fitted are connected to the vertical bar 105 at their end region which is not shown in FIG. 4b. It can be clearly seen from this view that both the first holding portion 2 has a latching nose 6 and also the second holding portion 3 has a latching nose 7. In addition the first holding portion 2 is prolonged, forming an actuating tab 8. The abutment tab 14 cannot be seen in this view as it is disposed in the region of the quick-fastening element, that is sectioned off by the cross-sectional view.

FIG. 5 shows a modification of the embodiment shown in FIGS. 2a, 2b and 2c, in the cross-sectional view also adopted in FIG. 2c. There are no latching noses on the holding elements 2 and 3, unlike the situation shown in FIGS. 2a, 2b and 2c. The holding portions 2 and 3 are however adapted along a circular arc to the contour of the respective bar, wherein the arcs in FIG. 5 each involve a larger center point angle than in the case of the holding elements 2 and 3 shown in FIGS. 2a, 2b and 2c.

FIG. 6 shows a modification of the embodiment shown in FIGS. 3a through 3d, in a perspective view corresponding to FIG. 3b. Unlike the case in that above-described embodiment however the embodiment shown in FIG. 6 provides that the tab 10 is angled relative to the plane of the plate-shaped connecting portion 4. As a result, in a condition of being mounted to a grid-like side portion 101, that tab bears against a side of the vertical bar 104, that is towards the quick-fastening element. In addition this embodiment differs from the embodiment described above in relation to FIGS. 3a through 3d, in that the tab 14 is not present. The tab 15 does not involve the above-described bend so that, when that quick-fastening element is fitted in the region of the end region (not shown) of the bar 102, the tab 15 can bear against the end region which is angled there.

FIG. 7 shows a lateral plan view of a quick-fastening element 1 according to the invention, which is mounted to a grid-like side portion 101 and which has an abutment tab 14. The first holding portion 2 and the second holding portion 3 come into engagement with the bars 102 and 103 respectively of the grid-like side portion 101. As a departure from the embodiments shown in the above-described Figures however this embodiment has a total of three fixing portions 5 on the connecting portion 4. In the embodiment shown in FIG. 7 a respective guide rail 100 is fitted to each of those fastening portions 5. The quick-fastening element 1 is fastened between the horizontal bars 102 and 103, the bar 102 being the upper bar of a pair of bars comprising the bars 102 and 102' of a grid-like side portion 101 and the bar 103 being the lower bar of a pair of bars 103 and 103' of the grid-like side portion.

FIGS. 1 through 7 each shown quick-fastening elements in which a fastening portion 5 projects out of a plane of the connecting portion due to a cranked configuration, by being stamped and embossed out. Such quick-fastening elements are suitable in particular for fitting telescopic partial extension arrangements. Quick-fastening elements are also conceivable in particular for fastening telescopic full-extension arrangements, in which the fastening portion corresponds to the connecting portion or is only stamped out of same but is not embossed out of same, so that it does not project out of the plane of the connecting portion.

For the purposes of the original disclosure it is pointed out that all features as can be seen by a man skilled in the art from the present description, the drawings and the appendant claims, even if they are described in specific terms only in connection with certain other features, can be combined both individually and also in any combinations with others of the features or groups of features disclosed herein insofar as that has not been expressly excluded or technical aspects make such combinations impossible or meaningless. A comprehensive explicit representation of all conceivable combinations of features and emphasis of the independence of the individual features from each other is dispensed with here only for the sake of brevity and readability of the description.

The invention is not intended to be limited to the embodiments which are disclosed in the drawings and the illustration and description of which is effected only by way of example.

LIST OF REFERENCES 1 quick-fastening element
2 first holding portion
3 second holding portion
4 connecting portion
5 fastening portion
6, 7 latching nose
8, 9 actuating tab
10, 11 tab
12, 13, 14, 15 abutment tab
100 guide rail
101 grid-like side portion
102 first horizontal bar
103 second horizontal bar
102', 103' further horizontal bar of a grid-like side portion
104, 105 vertical bar

The invention claimed is:

1. A combination comprising:
a quick-fastening element (1),
a horizontally extending guide rail (100), and
a grid-like side portion (101), wherein the grid-like side portion (101) comprises at least two adjacent horizontally extending bars (102, 103),
wherein the horizontally extending guide rail (100) is releasably fastened by the quick-fastening element (1) to the at least two adjacent horizontally extending bars (102, 103) of the grid-like side portion (101), wherein the at least two adjacent horizontally extending bars (102, 103) are arranged in a substantially vertically superposed and parallel relationship, wherein a first bar (102) of the at least two adjacent horizontally extending bars (102, 103) is bent at an angle in an end region of the first bar (102) and wherein a second bar (103) of the at least two adjacent horizontally extending bars (102, 103) is bent at an angle in an end region of the second bar (103),
wherein the quick-fastening element (1) has
 a first holding portion (2) adapted for at least a force-locking engagement of the quick-fastening element (1) with the first bar (102),
 a second holding portion (3) adapted for at least a force-locking engagement of the quick-fastening element (1) with the second bar (103),
 a connecting portion (4) arranged between the first holding portion (2) and the second holding portion (3) and connecting the first and second holding portions (2, 3), and
 at least one fastening portion (5) extending from the connecting portion (4),
wherein the connecting portion (4) has a front surface and a rear surface,
wherein the first holding portion (2) extends from a first end of the connecting portion (4) and extends entirely continuously frontward with respect to the rear surface of the connecting portion (4), wherein a region of the first holding portion (2) adjacent to the connecting portion (4) is in an angled relationship in relation to the connecting portion (4),
wherein the second holding portion (3) extends from a second end of the connecting portion (4) and extends entirely continuously frontward with respect to the rear surface of the connecting portion (4), wherein a region of the second holding portion (3) adjacent to the connecting portion (4) is in an angled relationship in relation to the connecting portion (4),
wherein the at least one fastening portion (5) is entirely frontward of the rear surface of the connecting portion (4),
wherein the quick-fastening element (1) is elastically deformable for a reduction in spacing between the first and second holding portions (2, 3) to provide the force-locking engagement of the first holding portion (2) with the first bar (102) and the force-locking engagement of the second holding portion (3) with the second bar (103), said reduction of the spacing adapted to lead to a prestressing of the first and second holding portions (2, 3) when the first and second holding portions (2, 3) are fastened between the first and second bars (102, 103), wherein the first and second holding portions (2, 3) are fastened between the first and second bars (102, 103) in a fastened condition and wherein the first and second holding portions (2, 3) in the fastened condition bear against mutually facing sides of the first and second bars (102, 103), and wherein the horizontally extending guide rail (100) is fastened at the at least one fastening portion (5).

2. The combination as set forth in claim 1, wherein the connecting portion (4) is substantially plate-shaped and the at least one fastening portion (5) is a tab-shaped portion projecting from a plane of the connecting portion (4) in a cranked configuration.

3. The combination as set forth in claim 1, wherein the first holding portion (2) has a section complementary to an outer contour of the first bar (102), or wherein the second holding portion (3) has a section complementary to an outer contour of the second bar (103).

4. The combination as set forth in claim 1, wherein the first holding portion (2) has at least one latching nose (6) in engagement with the first bar (102), or wherein the second holding portion (3) has at least one latching nose (7) in engagement with the second bar (103).

5. The combination as set forth in claim 1, wherein the first holding portion (2) has an actuating tab (8) at a side of the first holding portion (2) remote from the connecting portion (4), or wherein the second holding portion (3) has an actuating tab (9) at a side of the second holding portion (3) remote from the connecting portion (4).

6. The combination as set forth in claim 5, wherein the actuating tab (8) of the first holding portion (2) is a prolongation of the first holding portion (2).

7. The combination as set forth in claim 1, wherein a section of the connecting portion (4) is of a substantially plate-shaped configuration and the connecting portion (4) has a first side edge and a second side edge arranged opposite the first side edge.

8. The combination as set forth in claim 7, wherein a tab (10) extends from the first side edge of the connecting portion (4), and the tab (10) extends substantially coplanar with the connecting portion (4) or in an angled relationship to a plane of the connecting portion (4).

9. The combination as set forth in claim 7, wherein a tab (11) extends from the second side edge of the connecting portion (4), and the tab (11) extends substantially coplanar with the connecting portion (4).

10. The combination as set forth in claim 1, wherein a first abutment tab (14) is arranged at a first side of the first holding portion (2) and substantially forms an angle with the first holding portion (2), or wherein a second abutment tab (15) is arranged at a second side of the first holding portion (2) and substantially forms an angle with the first holding portion (2).

11. The combination as set forth in claim 1, wherein the at least one fastening portion (5) of the quick-fastening element (1) is a first fastening portion (5) and the horizontally extending guide rail (100) is a first horizontally extending guide rail (100) of the combination.

12. The combination as set forth in claim 9, wherein the quick-fastening element (1) further includes a second fastening portion (5) extending from the connecting portion (4) for fastening a second horizontally extending guide rail (100).

13. The combination as set forth in claim 11, wherein the quick-fastening element (1) further includes a second fastening portion (5) extending from the connecting portion (4) for fastening a second horizontally extending guide rail (100) and a third fastening portion (5) extending from the connecting portion (4) for fastening a third horizontally extending guide rail (100).

14. The combination as set forth in claim 9, wherein the quick-fastening element (1) further includes a second fastening portion (5) extending from the connecting portion (4) for fastening a second horizontally extending guide rail (100), a third fastening portion (5) extending from the connecting portion (4) for fastening a third horizontally extending guide rail (100), and a fourth fastening portion (5) extending from the connecting portion (4) for fastening a fourth horizontally extending guide rail (100).

15. The combination as set forth in claim 1, wherein the first holding portion (2), the second holding portion (3), and the connecting portion (4) are in one piece.

16. The combination as set forth in claim 15, wherein the first holding portion (2), the second holding portion (3), the connecting portion (4), and the at least one fastening portion (5) are in one piece.

17. The combination as set forth in claim 15, wherein the first holding portion (2), the second holding portion (3), and the connecting portion (4) are in one piece consisting of a steel sheet.

18. The combination as set forth in claim 17, wherein the steel sheet is a stainless steel sheet.

* * * * *

UNITED STATES PATENT AND TRADEMARK OFFICE
CERTIFICATE OF CORRECTION

PATENT NO. : 10,731,866 B2
APPLICATION NO. : 15/110760
DATED : August 4, 2020
INVENTOR(S) : Heffel et al.

Page 1 of 1

It is certified that error appears in the above-identified patent and that said Letters Patent is hereby corrected as shown below:

In the Specification

Column 8, Lines 10-11, change "1b and is has" to -- 1b and 1c has --

Column 9, Line 12, change "Figure is for" to -- Figure 1c for --

In the Claims

Column 14, Line 29, change "claim 9" to -- claim 11 --

Signed and Sealed this
Twenty-second Day of September, 2020

Andrei Iancu
*Director of the United States Patent and Trademark Office*